US010392552B2

(12) United States Patent
Sun et al.

(10) Patent No.: US 10,392,552 B2
(45) Date of Patent: Aug. 27, 2019

(54) WATER-BASED DRILLING FLUID FOR PROTECTING FRACTURED RESERVOIRS, AND PREPARATION METHOD AND USE THEREOF

(71) Applicant: China University of Petroleum (East China), Qingdao (CN)

(72) Inventors: Jinsheng Sun, Qingdao (CN); Kaihe Lv, Qingdao (CN); Jingping Liu, Qingdao (CN)

(73) Assignee: CHINA UNIVERSITY OF PETROLEUM (EAST CHINA) (CN)

( * ) Notice: Subject to any disclaimer, the term of this patent is extended or adjusted under 35 U.S.C. 154(b) by 0 days.

(21) Appl. No.: 15/809,590

(22) Filed: Nov. 10, 2017

(65) Prior Publication Data

US 2018/0208823 A1 Jul. 26, 2018

(30) Foreign Application Priority Data

Jan. 22, 2017 (CN) .......................... 2017 1 0053198

(51) Int. Cl.
*C09K 8/24* (2006.01)
(52) U.S. Cl.
CPC ............ *C09K 8/24* (2013.01); *C09K 2208/08* (2013.01); *C09K 2208/34* (2013.01)
(58) Field of Classification Search
CPC .............................. C09K 2208/08; C09K 8/24
See application file for complete search history.

(56) References Cited

U.S. PATENT DOCUMENTS

| 3,199,591 A | * | 8/1965 | Kepley | ..................... C09K 8/62 |
| | | | | 166/279 |
| 4,836,940 A | * | 6/1989 | Alexander | ............... C09K 8/50 |
| | | | | 175/72 |

(Continued)

FOREIGN PATENT DOCUMENTS

| CN | 103013467 A | 4/2013 |
| CN | 103555301 A | 2/2014 |

(Continued)

OTHER PUBLICATIONS

English translation CN 104178095A (Year: 2014).*

*Primary Examiner* — Alicia Bland
(74) *Attorney, Agent, or Firm* — Calfee, Halter & Griswold LLP

(57) ABSTRACT

The present invention relates to the technical field of petroleum drilling, and discloses a water-based drilling fluid for protecting fractured reservoirs and preparation method and use thereof. The drilling fluid includes: bentonite, a tackifier, a diluent, a filtrate reducer, an anti-collapse agent, a reservoir protectant composition, a lubricant, and water, wherein, the reservoir protectant composition comprises at least one of a polymer elastic granule, a synthetic fiber and a film former; the polymer elastic granule comprises an intermediate product, an alkali, a salt, and water in specific contents; the intermediate product is prepared from raw materials including acrylamide, a cationic monomer, a cross-linker, an initiator, a toughener, and water in specific contents. The drilling fluid provided in the present invention has a temperature-resistant property up to 200° C. or above, achieves a high temporary plugging success ratio, has a unidirectional plugging characteristic, and attains an outstanding reservoir protection effect.

20 Claims, 1 Drawing Sheet

Reservoir          Wellbore

(56) References Cited

U.S. PATENT DOCUMENTS

| | | | | |
|---|---|---|---|---|
| 5,735,349 A | * | 4/1998 | Dawson | C09K 8/512 |
| | | | | 166/294 |
| 6,169,058 B1 | * | 1/2001 | Le | C09K 8/62 |
| | | | | 166/308.4 |
| 2009/0229822 A1 | * | 9/2009 | Hutchins | C09K 8/685 |
| | | | | 166/283 |
| 2012/0298354 A1 | * | 11/2012 | Sullivan | C08F 226/04 |
| | | | | 166/248 |
| 2013/0126243 A1 | * | 5/2013 | Smith | C09K 8/05 |
| | | | | 175/65 |
| 2013/0233553 A1 | * | 9/2013 | Bugrin | C09K 8/512 |
| | | | | 166/292 |
| 2014/0171346 A1 | * | 6/2014 | Fefer | C09K 8/32 |
| | | | | 507/103 |

FOREIGN PATENT DOCUMENTS

| | | | |
|---|---|---|---|
| CN | 104178095 A | * | 12/2014 |
| CN | 104277803 A | | 1/2015 |
| CN | 105713583 A | | 6/2016 |

* cited by examiner

Reservoir        Wellbore

WATER-BASED DRILLING FLUID FOR PROTECTING FRACTURED RESERVOIRS, AND PREPARATION METHOD AND USE THEREOF

RELATED APPLICATIONS

This application is a continuation of and claims priority to Chinese Patent Application No. 201710053198.3, filed on Jan. 22, 2017, which is incorporated herein in its entirety.

FIELD OF SUBJECT MATTER

The present invention relates to the technical field of petroleum drilling, in particular to a water-based drilling fluid for protecting fractured reservoirs, a method for preparing the water-based drilling fluid, and use of the water-based drilling fluid.

BACKGROUND

In fractured reservoirs, the fractures are good infiltration flow channels through which the reservoirs communicate with the well bore. However, when a fractured reservoir is encountered during drilling, the drilling fluid will intrude into the reservoir along the fractures under pressure difference, resulting in reservoir damages and decreased oil and gas output. Up to now, domestic and foreign researchers have made long-time researches on drilling fluid techniques for fractured reservoir protection, and have developed fractured reservoir protective drilling fluid systems. Existing fractured reservoir protective drilling fluids are mainly water-based drilling fluids, in which usually several materials work with each other to attain a reservoir protection effect. Those protective materials usually contain rigid granule (e.g., calcium carbonate), fiber and/or bitumen materials, etc., and attain an effect of plugging fractures and preventing intrusion of the drilling fluid by means of compounding of these constituents. The drilling fluid based on above-mentioned protective materials protects the reservoir mainly by means of a shielded temporary plugging mechanism.

Drilling fluids based on a shielded temporary plugging technique has the following drawbacks in protecting the fractured reservoir: Firstly, to attain a good shielded temporary plugging effect, the widths and distributional characteristics of the reservoir fractures must be ascertained; however, owing to the heterogeneous characteristic of the reservoir, it is difficult to seize the characteristics of the reservoir fractures accurately; consequently, the temporary plugging effect is often unsatisfactory; secondly, since the protective materials have to enter into the fractures to generate a plugging effect, the plugged zone blocks the oil and gas from flowing into the well bore while it blocks the drilling fluid from entering into the reservoir; therefore, plug removal has to be carried out after drilling. Hence, there is an urgent need for developing an innovative water-based drilling fluid, which is applicable to fractured reservoirs and has strong plugging capability, and can flow back easily, to overcome the drawbacks of the existing fractured reservoir protective drilling fluids.

SUMMARY OF THE INVENTION

To overcome the above-mentioned drawbacks in the existing fractured reservoir protection techniques in the prior art, the present invention provides a water-based drilling fluid for protecting fractured reservoirs, an method for preparing the water-based drilling fluid, and use of the water-based drilling fluid. The drilling fluid has a temperature-resistant property up to 200° C. or above, achieves a high success ratio for temporary plugging, has a unidirectional plugging characteristic, can effectively overcome the defects or drawbacks in the prior art, and attains an outstanding reservoir protection effect.

To attain the above-mentioned object, in a first aspect, the present invention provides a water-based drilling fluid, which comprises: optional bentonite, a tackifier, an optional diluent, a filtrate reducer, an optional anti-collapse agent, a reservoir protectant composition, an optional lubricant, and water, wherein, the reservoir protectant composition comprises a polymer elastic granule and at least one of a synthetic fiber and a film former, wherein, the polymer elastic granule comprises an intermediate product, an alkali, a salt, and water, and, based on 100 pbw (Parts By Weight) of the polymer elastic granule, the dose of the intermediate product is 5-40 pbw, the dose of the alkali is 1-10 pbw, and the dose of the salt is 1-12 pbw, wherein, the intermediate product is prepared from raw materials including acrylamide, a cationic monomer, a cross-linker, an initiator, a toughener, and water, and, based on 100 pbw of the raw materials, the dose of the acrylamide is 8-30 pbw, the dose of the cationic monomer is 1-10 pbw, the dose of the cross-linker is 0.01-0.5 pbw, the dose of the initiator is 0.01-0.1 pbw, and the dose of the toughener is 5-25 pbw.

In a second aspect, the present invention provides a method for preparing the above water-based drilling fluid, comprising: mixing optional bentonite, the tackifier, the optional diluent, the filtrate reducer, the optional anti-collapse agent, the reservoir protectant composition, the optional lubricant, and water homogeneously.

In a third aspect, the present invention provides a use of the water-based drilling fluid disclosed in the present invention in reservoir drilling; preferably, the reservoir is a fractured reservoir.

Compared with the prior art, the water-based drilling fluid provided in the present invention attains the following outstanding effects:

(1) Outstanding Fractured Reservoir Protection Effect

The water-based drilling fluid in the present invention contains a reservoir protectant composition, in which the polymer elastic granule has the following obvious advantages:

① High plugging speed and high plugging success ratio: the polymeric elastic granules are elastic granules that are in irregular shapes, deformable, and durable, and have high elasticity and toughness; when the diameter of the polymeric elastic granules is greater than the width of reservoir fractures (polymeric elastic granules at appropriate granularity can be prepared according to the actual condition of application, so that the diameter of the polymeric elastic granules is greater than the width of reservoir fractures), under pressure difference, the elastic granules can be embedded in the fracture entries in part and seal the fractures, while the remaining part is still outside of the fractures and attains a plugging effect (see FIG. 1). Furthermore, the polymeric elastic granules are highly adaptive to fractures with entries in different shapes, thus overcome the drawback of poor adaptability of rigid granules owing to lack of deformation capability, and can plug the fractures quickly and attain an purpose of blocking the drilling fluid from further intruding into the reservoir.

② Unidirectional plugging, without plug removal: The polymeric elastic granules are embedded in the entries of the fractures rather than enter into the interior of the fractures, and the embedded plugging layer can be removed easily provided that there is counter pressure difference. Therefore, no special plug remove measure is required when a polymer elastic granule is used, the plug will be removed automatically under drawdown pressure (negative pressure difference) after well completion, and the original permeability of the reservoir will be recovered; thus, the oil well productivity will not be affected, and plug removal work is not required.

③ Wide temperature and degree of mineralization applicability: the polymeric elastic granules exist stably within a temperature range of room temperature to 200° C. temperature, have high thermostability, and are suitable to reservoirs with different depths; the polymeric elastic granules can be used in hypersalinity brine drilling fluids because degree of mineralization has little influence on the properties of the polymeric elastic granules.

The granules of the synthetic fiber in the reservoir protectant composition are flexible and have a high length-to-diameter ratio, they often exist in clusters in the drilling fluid, and if the sizes of the clustered granules are greater than the width of fractures, the clustered granules attain a plugging effect at the entries of the fractures; owing to the fact that the clustered granules have multiple contact points with the rock at the entries of the fractures, the clustered granules firmly adhere to the entries of the fractures and form a bridged fiber network, which can effective prevent intrusion of the drilling fluid into the reservoir. Since the plugs are also at the entries of the fractures rather than enter into the interior of the fracture, they have a deformable property, and can be removed more easily than rigid granules; namely, they have a unidirectional plugging characteristic.

The main constituent of the film former in the reservoir protectant composition is micellar polymers, which occur an associated reaction and form a large quantity of micelles in different sizes at critical concentration, wherein, the inner core of the micelle is composed of a hydrophobic group of the micellar polymer, and the outer layer is composed of hydrophilic segments of the micellar polymer. Under pressure difference, the micelles accumulate on the rock surface to form a shielding film (see FIG. 2), which prevents the drilling fluid from intruding into the reservoir. It can be seen from FIG. 2: the shielding film formed by the film former only exists on the surface of the rock of well wall rather than enter into the interior of the rock; the plugging effect will be removed automatically and the original permeability of the reservoir will be recovered if counter pressure difference exists, and the oil well productivity will not be affected.

In summary, in the reservoir protectant composition, polymer elastic granule and at least one of synthetic fiber and film former can exert a good synergetic effect. According to a preferred embodiment of the present invention, the three constituents, i.e., the polymer elastic granule, synthetic fiber, and film former exert a better synergetic effect. Wherein, firstly, the polymer elastic granule and the synthetic fiber plug larger fractures and decrease the sizes of the fractures; then, on that basis, the film former forms a shielding film of polymer micelles on the surface of the rock of well wall; thus, with a recombination action of "embedded shielding/bridged shielding-film shielding", a reservoir protection effect is attained by virtue of synergistic interaction of a number of effects.

Accordingly, the water-based drilling fluid provided in the present invention is especially suitable to fractured reservoir protection, and has the following characteristics in reservoir protection:

① The protecting layer formed by the water-based drilling fluid in the present invention mainly exists on the surface of the well wall or at the entries of the fractures rather than inside the reservoir fractures. Therefore, no additional plug removal work is required when the water-based drilling fluid provided in the present invention is used; the plug can be removed in the condition that counter pressure difference produced at the downhole after the drilling is completed.

② The water-based drilling fluid provided in the present invention has high adaptability and high temporary plugging success ratio. Existing common shielded temporary plugging techniques require that calcium carbonate or other rigid particles enter into the fractures to bridge, and the size of the bridging particles must strictly match the width of fractures; otherwise the bridging can't effectively produce a plugging effect. Owing to the heterogeneous characteristic of the reservoir, usually it is difficult to accurately ascertain the width distribution of the reservoir fractures; in such a case, the size of the bridging particles is selected blindly, and the temporary plugging effect is poor. The water-based drilling fluid provided in the present invention requires that the size of the polymeric elastic granules is greater than the width of fractures; in the case that the width distribution of the reservoir fractures can't be ascertained, granules in a larger size can be selected to ensure an embedded temporary plugging effect; the shielding film formed by the polymeric micelles of the film former also has high adaptability, and has a universal plugging performance on the fractures plugged by the polymer elastic granule and the synthetic fiber. Therefore, in the case that the width distribution of the reservoir fractures is known or unknown, the water-based drilling fluid provided in the present invention always can attain a good plugging effect; in contrast, existing shielded temporary plugging techniques can attain a good plugging effect only if the width distribution of the reservoir fractures is known.

(2) High Temperature-Resistance, Suitable for Deep Well Drilling and Ultra-Deep Well Drilling According to a preferred embodiment of the present invention, all of the major treating agents contained in the water-based drilling fluid provided in the present invention, including sulfonate copolymer DSP-2, sulfomethylated lignite resin SPNH, organic amine shale inhibitor AP-2, polyether polyol SYP-2 and reservoir protectant composition, etc., have a good temperature-resistant property. Therefore, the water-based drilling fluid provided in the present invention can be resistant to high temperature up to 200° C. or above, and can be used in deep wells and extra-deep wells.

(3) High Lubrication Property, Suitable for Highly-Deviated Wells, Directional Wells, and Horizontal Wells According to a preferred embodiment of the present invention, the water-based drilling fluid provided in the present invention contains polyether polyol SYP-2, which has a good lubrication property; in addition, the organic amine shale inhibitor AP-2 that serves as an anti-collapse agent in the water-based drilling fluid also has a good lubrication property. Therefore, the water-based drilling fluid provided in the present invention has an outstanding lubrication property, can effectively reduce friction resistance and torque generated as a result of rotation of the drilling tool during the drilling process, and is suitable for highly-deviated wells, directional wells, and horizontal wells.

(4) Simple Formulation, Quick Preparation

The drilling fluid has a relatively simple formulation, can be prepared easily and quickly, and has a low overall cost.

(5) Helpful for Environmental Protection

All of the additives are nontoxic and easy to biodegrade, have little impact on sensitive regions, and are helpful for environmental protection.

Other features and advantages of the present invention will be further detailed in the embodiments hereunder.

DESCRIPTION OF THE DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention. In the figures.

DETAILED DESCRIPTION OF THE EMBODIMENTS

Figure 1:
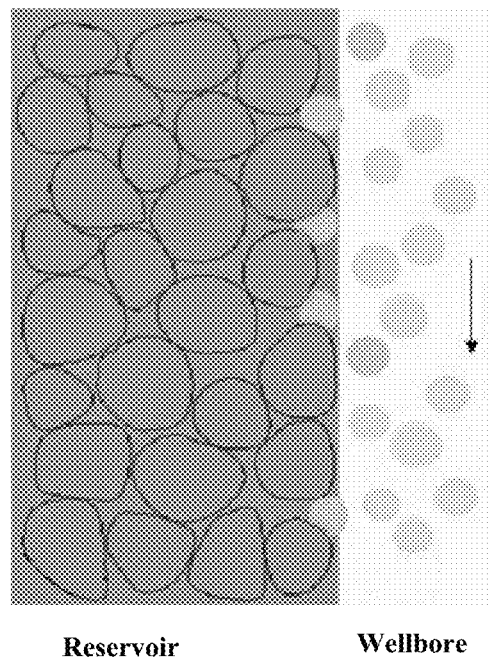
FIG. 1 is a schematic diagram of embedded plugging of the polymer elastic granule in the reservoir protectant composition in the water-based drilling fluid according to the present invention.
Figure 2:
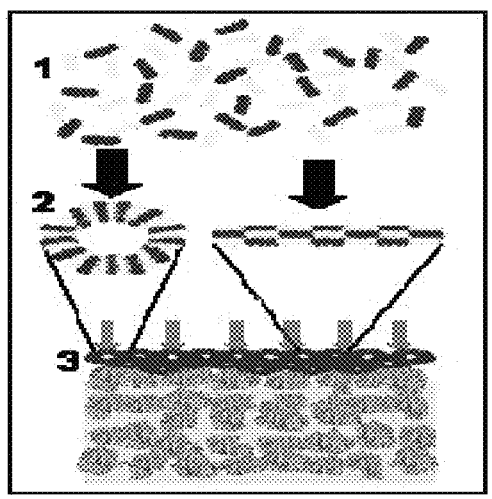
FIG. 2 is a schematic diagram of shielding effect of the film former in the reservoir protectant composition in the water-based drilling fluid according to the present invention, wherein, 1—film former, 2—film former micelles, 3—low-permeability screened film formed by the film former micelles.

Hereunder some embodiments of the present invention will be detailed. It should be understood that the embodiments described here are only provided to describe and explain the present invention, but shall not be deemed as constituting any limitation to the present invention.

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

In a first aspect, the present invention provides a water-based drilling fluid, which comprises: optional bentonite, a tackifier, an optional diluent, a filtrate reducer, an optional anti-collapse agent, a reservoir protectant composition, an optional lubricant, and water, wherein, the reservoir protectant composition comprises a polymer elastic granule and at least one of a synthetic fiber and a film former, wherein, the polymer elastic granule comprises an intermediate product, an alkali, a salt, and water, and, based on 100 pbw of the polymer elastic granule, the dose of the intermediate product is 5-40 pbw, the dose of the alkali is 1-10 pbw, and the dose of the salt is 1-12 pbw, wherein, the intermediate product is prepared from raw materials including acrylamide, a cationic monomer, a cross-linker, an initiator, a toughener, and water, and, based on 100 pbw of the raw materials, the dose of the acrylamide is 8-30 pbw, the dose of the cationic monomer is 1-10 pbw, the dose of the cross-linker is 0.01-0.5 pbw, the dose of the initiator is 0.01-0.1 pbw, and the dose of the toughener is 5-25 pbw.

Those skilled in the art should understand: in the reservoir protectant composition in the water-based drilling fluid provided in the present invention, "the reservoir protectant composition comprises a polymer elastic granule and at least one of a synthetic fiber and a film former" refers to that the reservoir protectant composition contains at least one of a synthetic fiber and a film former, besides the polymer elastic granule, i.e., the reservoir protectant composition comprises the polymer elastic granule and the synthetic fiber, or the reservoir protectant composition comprises the polymer elastic granule and the film former, or the reservoir protectant composition comprises the polymer elastic granule, the synthetic fiber, and the film former.

For the water-based drilling fluid provided in the present invention, to further improve the reservoir protection capability of the drilling fluid, preferably, the mass ratio of the polymer elastic granule to the synthetic fiber is 1:(0.1-1.5), further preferably is 1:(0.25-1).

For the water-based drilling fluid provided in the present invention, to further improve the reservoir protection capability of the drilling fluid, preferably, the mass ratio of the polymer elastic granule to the film former is 1:(0.1-1.5), further preferably is 1:(0.25-1).

For the water-based drilling fluid provided in the present invention, to further improve the reservoir protection capability of the drilling fluid, preferably, the reservoir protectant composition comprises a polymer elastic granule, a synthetic fiber and a film former, and the mass ratio of the polymer elastic granule to the synthetic fiber to the film former is 1:(0.1-1.5):(0.1-1.5), further preferably is 1:(0.25-1):(0.25-1).

For the reservoir protectant composition in the water-based drilling fluid provided in the present invention, for the convenience of use, preferably, the polymer elastic granule, synthetic fiber, and film former in the reservoir protectant composition are packaged separately before the reservoir protectant composition is used.

For the reservoir protectant composition in the water-based drilling fluid provided in the present invention, there is no particular limitation on the synthetic fiber; the synthetic fiber may be any synthetic fiber commonly used in the art; preferably, the synthetic fiber is at least one of polyester fiber, polyamide fiber, polyacrylonitrile fiber, polyvinyl alcohol fiber, polyvinyl formal fiber, and polyurethane elastic fiber. More preferably, the synthetic fiber is polyester fiber, such as polyester fiber TZT-PET-6 purchased from Shenzhen tianZhiTu Technology Co., Ltd.

For the reservoir protectant composition in the water-based drilling fluid provided in the present invention, there is no particular limitation on the film former; the film former may be any film former commonly used in the art; preferably, the film former is at least one of ultra-low permeability drilling fluid treating agents, zero-permeability drilling fluid treating agents (or non-permeability drilling fluid treating agents), and other products that have a similar function. More preferably, the film former is zero-permeability drilling fluid treating agents, such as zero-permeability drilling fluid treating agents HY-3000 purchased from Hebei Huayun Hongye Chemical Co., Ltd.

For the water-based drilling fluid provided in the present invention, to further improve the reservoir protection capability of the drilling fluid, preferably, based on 100 pbw of the raw materials for preparing the intermediate product, the dose of the acrylamide is 10-25 pbw, the dose of the cationic monomer is 2-5 pbw, the dose of the cross-linker is 0.01-0.05 pbw, the dose of the initiator is 0.02-0.05 pbw, and the dose of the toughener is 8-15 pbw. Those skilled in the art should understand that the dose of water in the raw materials for preparing the intermediate product meets a criterion that the sum parts by weight (pbw) of all constituents constituting the raw materials is 100.

For the reservoir protectant composition in the water-based drilling fluid provided in the present invention, preferably, the cationic monomer is a quaternary ammonium compound, further preferably is at least one of dimethyldiallyl ammonium halide (e.g., dimethyldiallyl ammonium chloride, dimethyldiallyl ammonium bromide), methacryloyloxyethyl-trimethyl ammonium halide (e.g., methacryloyloxyethyl-trimethyl ammonium chloride, methacryloyloxyethyl-trimethyl ammonium bromide), acryloyloxyethyl-trimethyl ammonium halide (e.g., acryloyloxyethyl-trimethyl ammonium chloride, acryloyloxyethyl-trimethyl ammonium bromide), alkyldimethylbenzyl ammonium halide, and alkyltrimethyl ammonium halide; still further preferably, the alkyl in the alkyldimethylbenzyl ammonium halide is C8-C20 alkyl (e.g., dodecyldimethylbenzyl ammonium chloride, hexadecyldimethylbenzyl ammonium bromide, octodecyldimethylbenzyl ammonium chloride), the alkyl in the alkyltrimethyl ammonium halide is C8-C20 alkyl (e.g., dodecyltrimethyl ammonium chloride, hexadecyltrimethyl ammonium bromide, octodecyltrimethyl ammonium chloride).

For the reservoir protectant composition in the water-based drilling fluid provided in the present invention, there is no particular limitation for the cross-linker; in other words, the cross-linker may be any cross-linker commonly used in the art; preferably, the cross-linker is at least one of N, N'-methylene-bis acrylamide, divinyl benzene, and glutaraldehyde.

For the reservoir protectant composition in the water-based drilling fluid provided in the present invention, there is no particular limitation for the initiator; in other words, the initiator may be any initiator commonly used in the art; preferably, the initiator is persulfate, more preferably is at least one of ammonium persulfate, potassium persulfate, and sodium persulfate.

For the reservoir protectant composition in the water-based drilling fluid provided in the present invention, there is no particular limitation for the toughener; in other words, the toughener may be any toughener commonly used in the art; preferably, the toughener is starch and/or bentonite.

For the reservoir protectant composition in the water-based drilling fluid provided in the present invention, the method for preparing the intermediate product may comprise: mixing the acrylamide, the cationic monomer, the cross-linker, the toughener and water, adding the initiator into the resultant mixture for initiating reaction, and then drying and pulverizing the reaction product.

Preferably, the method for mixing the acrylamide, the cationic monomer, the cross-linker, the toughener, and water are mixed comprises: (1) dissolving the acrylamide, the cationic monomer and the cross-linker in water and stirring to a homogeneous state; (2) adding the toughener into the mixture obtained in the step (1), and stirring to a homogenous state; (3) stirring the mixture obtained in the step (2) in a protective atmosphere. Wherein, the protective atmosphere may be nitrogen and/or an inert gas, and the stirring time in the step (3) may be 20-30 min.

Preferably, the reaction conditions include: temperature: 30-60° C., time: 3-5 h. The supply of the protective gas and the stirring can be stopped after the reaction.

Preferably, the drying conditions include: temperature: 50-150° C., time: 10-24 h.

In the present invention, there is no particular limitation for the granularity of the product obtained by pulverization; the polymer elastic granule produced from the product obtained by pulverization may be in diameter greater than the width of fractures of the reservoir, according to the width of fractures of the applicable reservoir.

In the water-based drilling fluid in the present invention, to further improve the reservoir protection capability of the drilling fluid, preferably, based on 100 pbw polymer elastic granule, the dose of the intermediate product is 10-30 pbw, the dose of the alkali is 2-5 pbw, and the dose of the salt is 5-10 pbw. Those skilled in the art should understand that in the polymer elastic granule above, the dose of water meets a criterion that the sum of the parts by weight (pbw) of all constituents of the polymer elastic granule is 100.

For the polymer elastic granule in the reservoir protectant composition of the water-based drilling fluid provided in the present invention, there is no particular limitation for the alkali; in other words, the alkali may be any alkali commonly used in the art; preferably, the alkali is at least one of sodium hydroxide, potassium hydroxide, sodium carbonate, potassium carbonate, sodium bicarbonate, and potassium bicarbonate.

For the polymer elastic granule in the reservoir protectant composition of the water-based drilling fluid provided in the present invention, there is no particular limitation for the salt; in other words, the salt may be any salt commonly used in the art; preferably, the salt is at least one of sodium chloride, potassium chloride, calcium chloride, sodium formate, potassium formate, and cesium formate.

For the polymer elastic granule in the reservoir protectant composition of the water-based drilling fluid provided in the present invention, preferably, the polymer elastic granule further comprises a bactericide, and, based on 100 pbw polymer elastic granule, the dose of the bactericide is 0.03-2 pbw, preferably is 0.05-1 pbw.

Wherein, preferably, the bactericide is an absorptive bactericide, further preferably is at least one of alkyltrimethyl ammonium halide, alkylpyridinium halide, and alkyldimethylbenzyl ammonium halide. Still further preferably, the alkyl in the alkyltrimethyl ammonium halide is C8-C20 alkyl (e.g., dodecyltrimethyl ammonium chloride, hexadecyltrimethyl ammonium bromide, octodecyltrimethyl ammonium chloride), the alkyl in the alkylpyridinium halide is C8-C20 alkyl (e.g., dodecylpyridinium chloride, hexadecylpyridinium chloride, octodecylpyridinium bromide), the alkyl in the alkyldimethylbenzyl ammonium halide is C8-C20 alkyl (e.g., dodecyldimethylbenzyl ammonium chloride, hexadecyldimethylbenzyl ammonium bromide, octodecyldimethylbenzyl ammonium chloride).

For the reservoir protectant composition in the water-based drilling fluid provided in the present invention, the method for preparing the polymer elastic granule may comprise: mixing the intermediate product, the alkali, the salt, optional bactericide, and water.

Preferably, the mixing method comprises: first, mixing the intermediate product, the alkali, and water (while stirring for 5-20 h), and then mixing the resultant mixture with the salt and the optional bactericide (while stirring for 0.5-2 h); or The mixing method comprises: first, mixing the intermediate product, the alkali, optional bactericide, and water (while stirring for 5-20 h), and then mixing the resultant mixture with the salt (while stirring for 0.5-2 h). Those skilled in the art should understand: in the method for preparing the polymer elastic granule, the "optional" bactericide refers to that the bactericide is added in an corresponding amount in the preparation process if the polymer elastic granule contains the bactericide, while an corresponding amount of the bactericide doesn't have to be added if the polymer elastic granule doesn't contain the bactericide.

In the water-based drilling fluid provided in the present invention, the doses of the constituents in the water-based drilling fluid may be selected according to the specific application scenario, wherein, the modifier "optional" for a constituent refers to that the constituent should be added in an corresponding amount in the preparation process of the water-based drilling fluid if the water-based drilling fluid contains that constituent, or an corresponding amount of the constituent doesn't have to be added in the preparation process if the water-based drilling fluid doesn't contain that constituent. Whether the constituents should be added or not in different application scenarios is well known to those skilled in the art, and will not be further detailed here.

In the water-based drilling fluid provided in the present invention, preferably, based on 100 ml water-based drilling fluid, the dose of the bentonite is 0-4 g, further preferably is 1-3 g.

In the water-based drilling fluid provided in the present invention, preferably, based on 100 ml water-based drilling fluid, the dose of the tackifier is 0.2-2 g, further preferably is 0.5-1 g.

In the water-based drilling fluid provided in the present invention, preferably, based on 100 ml water-based drilling fluid, the dose of the diluent is 0-2 g, further preferably is 0.5-1 g.

In the water-based drilling fluid provided in the present invention, preferably, based on 100 ml water-based drilling fluid, the dose of the filtrate reducer is 1-5 g, further preferably is 2-4 g.

In the water-based drilling fluid provided in the present invention, preferably, based on 100 ml water-based drilling fluid, the dose of the anti-collapse agent is 0-3 g, further preferably is 1-2 g.

In the water-based drilling fluid provided in the present invention, preferably, based on 100 ml water-based drilling fluid, the dose of the reservoir protectant is 1-5 g, further preferably is 2-4 g.

In the water-based drilling fluid provided in the present invention, preferably, based on 100 ml water-based drilling fluid, the dose of the lubricant is 0-5 g, further preferably is 2-3 g.

In the water-based drilling fluid provided in the present invention, the bentonite refers to clay with montmorillonite as the main mineral component, which can render viscous shearing force, filter loss control and wall building capability to the drilling fluid; for example, the bentonite may be sodium bentonite and/or calcium bentonite, preferably is sodium bentonite.

In the water-based drilling fluid provided in the present invention, the tackifier can improve the viscous shearing force of the drilling fluid; for example, the tackifier may be at least one of sulfonate copolymer (e.g., DSP-2), potassium polyacrylamide (KPAM), polyanionic cellulose (e.g., PAC141, PAC-HV), xanthan gum (XC), sodium carboxymethylcellulose (Na-CMC), and polyacrylamide (PAM), preferably is sulfonate copolymer (e.g., DSP-2).

In the water-based drilling fluid provided in the present invention, the diluent have effects of reducing the viscosity of the drilling fluid, adjusting the flow pattern of the drilling fluid, and improving the shear-thinning property of the drilling fluid; for example, the diluent may be an zwitterionic polymer viscosity reducer (e.g., XY-27) and/or sulfonated sodium tannin (SMT), preferably is sulfonated sodium tannin (SMT).

In the water-based drilling fluid provided in the present invention, the filtrate reducer can improve the filter loss control and wall building capability of the drilling fluid; for example, the filtrate reducer may be at least one of sulfomethylated phenolic resin (e.g., SMP-I, SMP-II), lignite resin (e.g., KFT), sulfomethylated lignite resin (e.g., SPNH), and zwitterionic polymer (e.g., JT-888), preferably is sulfomethylated lignite resin (e.g., SPNH).

In the water-based drilling fluid provided in the present invention, the anti-collapse agent can prevent well wall collapse and improve well wall stability; for example, the anti-collapse agent may be at least one of organic amine shale inhibitor (e.g., AP-2), potassium humate (KHM), organic silicon (e.g., GF-1), and modified asphalt (e.g., FT-1), preferably is organic amine shale inhibitor (e.g., AP-2).

In the water-based drilling fluid provided in the present invention, the lubricant can improve the lubrication property of the drilling fluid, reduce friction resistance and torque and thereby reduce the risk of jamming of the drilling tool in the drilling process; for example, the lubricant may be at least one of graphite, mineral oil, vegetable oil, plastic beads, and polyether glycol (e.g., SYP-2), preferably is polyether glycol (e.g., SYP-2).

In the water-based drilling fluid provided in the present invention, all of the constituents described above can be commercially available.

According to a preferred embodiment, the water-based drilling fluid provided in the present invention contains sodium bentonite, sulfonate copolymer (e.g., DSP-2), sulfonated sodium tannin, sulfomethylated lignite resin (e.g., SPNH), organic amine shale inhibitor (e.g., AP-2), polyether glycol (e.g., SYP-2), reservoir protectant composition, and water, and, based on 100 ml water-based drilling fluid, the dose of the sodium bentonite is 0-4 g, preferably is 1-3 g; the dose of the sulfonate copolymer (e.g., DSP-2) is 0.2-2 g, preferably is 0.5-1 g; the dose of the sulfonated sodium tannin is 0-2 g, preferably is 0.5-1 g; the dose of the sulfomethylated lignite resin (e.g., SPNH) is 1-5 g, preferably is 2-4 g; the dose of the organic amine shale inhibitor (e.g., AP-2) is 0-3 g, preferably is 1-2 g; the dose of the polyether glycol (e.g., SYP-2) is 0-5 g, preferably is 2-3 g; the dose of the reservoir protectant composition is 1-5 g, preferably is 2-4 g.

In a second aspect, the present invention further provides a method for preparing the water-based drilling fluid described above, comprising: mixing optional bentonite, a tackifier, an optional diluent, a filtrate reducer, an optional anti-collapse agent, a reservoir protectant composition, an optional lubricant, and water homogeneously.

preferably, the method comprises: mixing bentonite, a tackifier, a diluent, a filtrate reducer, an anti-collapse agent, a reservoir protectant composition, a lubricant, and water homogeneously, wherein, the mixing method comprises: mixing bentonite and water (while stirring for 1-5 h); then, after 18-36 h, adding a tackifier into the system and stirring (till the tackifier is dissolved fully); and then adding a filtrate reducer, an anti-collapse agent, a lubricant, a diluent, and a reservoir protectant composition, and stirring for 20-40 min. There is no particular limitation for the sequence in which the filtrate reducer, anti-collapse agent, lubricant, diluent, and reservoir protectant composition are added, that is to day, those constitutes may be added in any sequence; moreover, there is no particular limitation for the sequence in which the constituents of the reservoir protectant composition are added, that is to say, the constituents may be added in any sequence.

In the method disclosed in the present invention, the selection of the types and doses of the bentonite, tackifier, diluent, filtrate reducer, anti-collapse agent, reservoir protectant composition, and lubricant has been described in the above content, and will not be further detailed here.

In a third aspect, the present invention provides the use of the water-based drilling fluid disclosed in the present invention in reservoir drilling.

The reservoir mentioned in the present invention may be a fractured reservoir or porous reservoir; preferably, the reservoir is a fractured reservoir, namely, the water-based drilling fluid disclosed in the present invention is especially suitable for use in reservoir plugging and protection in the drilling process of a fractured reservoir.

EXAMPLES

Hereunder the present invention will be detailed in some examples, but it should be noted that the present invention are not limited to those examples. In the following preparation examples, examples, and comparative examples, unless otherwise specified, all of the materials are commercially available, and all of the methods are conventional methods in the art.

The polyester fiber material is purchased from Shenzhen TZT Technology Co., Ltd., with designation TZT-PET-6.

The polyacrylonitrile fiber material is purchased from Shenzhen TZT Technology Co. Ltd, with designation TZT-PAN-6.

The zero-permeability drilling fluid additive is purchased from Hebei Huayun Hongye Chemical Co., Ltd., with designation HY-3000.

The ultra-low permeability drilling fluid additive is purchased from Shijiazhuang Hualai Dingsheng Technology Co., Ltd., with designation YP-4.

Preparation Example 1

This preparation example is provided here to describe the preparation method of the polymer elastic granule.

20 kg acrylamide, 4 kg dimethyldiallyl ammonium chloride and 0.01 kg N, N'-methylene-bis acrylamide are dissolved fully in 67.96 kg water, and then 8 kg sodium bentonite is added into the solution, and the mixture is stirred to a homogeneous state. The above-mentioned reaction liquid is loaded into a reactor equipped with a stirrer, a condenser tube and a thermometer, nitrogen is supplied for protection, the reaction liquid is stirred for 20 min., and then the temperature is adjusted to 60° C., 0.03 kg ammonium persulfate is added, the nitrogen supply and the stirring are stopped, and the reaction liquid is held for 3 h for reaction; the reaction product is taken out, dried for 15 h at 105° C., and pulverized to obtain a granular intermediate product of reservoir protectant.

10 kg intermediate product and 5 kg sodium carbonate are added into 79.95 kg water and the liquid is stirred continuously for 10 h, then 5 kg sodium chloride and 0.05 kg octodecyltrimethyl ammonium chloride are added, and the liquid is stirred further for 0.5 h; thus, a polymer elastic granule A1 is obtained.

Preparation Example 2

This preparation example is provided here to describe the preparation method of the polymer elastic granule.

25 kg acrylamide, 5 kg methacryloyloxyethyl-trimethyl ammonium chloride and 0.02 kg N, N'-methylene-bis acrylamide are dissolved fully in 59.93 kg water, and then 10 kg starch is added into the solution, and the mixture is stirred to a homogeneous state. The above-mentioned reaction liquid is loaded into a reactor equipped with a stirrer, a condenser tube and a thermometer, nitrogen is supplied for protection, the reaction liquid is stirred for 30 min., and then the temperature is adjusted to 50° C., 0.05 kg potassium persulfate is added, the nitrogen supply and the stirring are stopped, and the reaction liquid is held for 4 h for reaction; the reaction product is taken out, dried for 12 h at 110° C., and pulverized to obtain a granular intermediate product of reservoir protectant.

20 kg intermediate product, 3 kg potassium hydroxide, and 0.3 kg hexadecylpyridinium chloride are added into 69.7 kg water and the liquid is stirred continuously for 10 h, then 7 kg potassium chloride is added, and the liquid is stirred further for 1 h; thus, a polymer elastic granule A2 is obtained.

Preparation Example 3

This preparation example is provided here to describe the preparation method of the polymer elastic granule.

10 kg acrylamide, 2 kg dodecyldimethylbenzyl ammonium chloride and 0.05 kg N, N'-methylene-bis acrylamide are dissolved fully in 72.93 kg water, and then 15 kg sodium bentonite is added into the solution, and the mixture is stirred to a homogeneous state. The above-mentioned reaction liquid is loaded into a reactor equipped with a stirrer, a condenser tube and a thermometer, nitrogen is supplied for protection, the reaction liquid is stirred for 25 min., and then the temperature is adjusted to 40° C., 0.02 kg sodium persulfate is added, the nitrogen supply and the stirring are stopped, and the reaction liquid is held for 5 h for reaction; the reaction product is taken out, dried for 18 h at 90° C., and pulverized to obtain a granular intermediate product of reservoir protectant.

30 kg intermediate product and 2 kg sodium hydroxide are added into 57 kg water and the liquid is stirred continuously for 15 h, then 10 kg sodium formate and 1 kg dodecyldimethylbenzyl ammonium chloride are added, and the liquid is stirred further for 0.5 h; thus, a polymer elastic granule A3 is obtained.

Preparation Example 4

Polymer elastic granule A4 is prepared according to the method described in the preparation example 1, but in the method for preparing the intermediate product, the amounts of acrylamide, dimethyldiallyl ammonium chloride, N, N'-methylene-bis acrylamide, water, sodium bentonite, and ammonium persulfate are 8 kg, 8 kg, 0.5 kg, 78.49 kg, 5 kg, and 0.01 kg respectively. Thus, a polymer elastic granule A4 is obtained.

Preparation Example 5

Polymer elastic granule A5 is prepared according to the method described in the preparation example 1, but the amounts of the intermediate product, sodium carbonate, water, sodium chloride, and octodecyltrimethyl ammonium chloride are 6 kg, 1 kg, 88.5 kg, 3 kg, and 1.5 kg respectively. Thus, a polymer elastic granule A5 is obtained.

In the following examples, (1) The zero-permeability drilling fluid additive HY-3000 is comprised of polyvinyl alcohol and plant fibre, wherein the content of the polyvinyl alcohol is 60 wt % and the content of the plant fibre is 40 wt %. The chemical structure of the polyvinyl alcohol is [—CH2-CH(OH)-]n. The general model of the polyvinyl alcohol is 1788 PVA, which means the degree of polymerization is 1700 and the degree of alcoholysis is 88%. The size of the plant fibre is smaller than 200 mesh.

(2) The ultra-low permeability drilling fluid additive YP-4 is comprised of polyvinyl alcohol and calcium carbonate, wherein the content of the polyvinyl alcohol is 50 wt % and the content of the calcium carbonate is 50 wt %. The chemical structure of the polyvinyl alcohol is [—CH2-CH(OH)-]n. The general model of the polyvinyl alcohol is 1788 PVA, which means the degree of polymerization is 1700 and the degree of alcoholysis is 88%. The size of the calcium carbonate is between 1500 mesh and 2000 mesh.

Example 1

A water-based drilling fluid is prepared according to the following formulation: 3% reservoir protectant composition (the composition is shown in Table 1, wherein, the polymer elastic granule used in the example 1 is A1, the synthetic fiber is polyester fiber TZT-PET-6, and the film former is zero-permeability drilling fluid additive HY-3000); 3% sodium bentonite (purchased from Anyang Yihe Bentonite Co., Ltd.); 1% sulfonate copolymer DSP-2 (purchased from Shandong Deshunyuan Petroleum Technology Co. Ltd.); 0.5% sulfonated sodium tannin (purchased from Shandong Yanggu Jiangbei Chemical Co., Ltd.); 2% sulfomethylated lignite resin SPNH (purchased from Shandong Deshunyuan Petroleum Technology Co. Ltd.); 1% organic amine shale inhibitor AP-2 (purchased from Shandong Deshunyuan Petroleum Technology Co. Ltd.); 3% polyether glycol SYP-2 (purchased from Shandong Deshunyuan Petroleum Technology Co., Ltd.), and water (accounts for the remaining content). The above-mentioned percentages in the drilling fluid are mass-volume ratios; for example, 3% sodium bentonite refers to that 3 g sodium bentonite is contained in 100 ml water-based drilling fluid.

Wherein, the method for preparing the water-based drilling fluid is as follows: the sodium bentonite is mixed with water, the mixture is stirred for 3 h and held for 24 h, and then the sulfonate copolymer DSP-2 is added into the system and stirring the system to make sulfonate copolymer DSP-2 dissolve fully; then, the sulfonated sodium tannin, sulfomethylated lignite resin SPNH, organic amine shale inhibitor AP-2, polyether glycol SYP-2, polymer elastic granule A1, polyester fiber TZT-PET-6, and zero-permeability drilling fluid additive HY-3000 are added, and the mixture is stirred for 40 min.

Example 2

A water-based drilling fluid is prepared according to the method described in the example 1, but the water-based drilling fluid is prepared according to the following formulation: 2% reservoir protectant composition (the composition is shown in Table 1, wherein, the polymer elastic granule used in the example 2 is A2, the synthetic fiber is polyacrylonitrile fiber TZT-PAN-6, and the film former is ultra-low permeability drilling fluid additive YP-4); 1% sodium bentonite (purchased from Anyang Yihe Bentonite Co., Ltd.); 0.5% sulfonate copolymer DSP-2 (purchased from Shandong Deshunyuan Petroleum Technology Co. Ltd.); 0.8% sulfonated sodium tannin (purchased from Shandong Yanggu Jiangbei Chemical Co., Ltd.); 3% sulfomethylated lignite resin SPNH (purchased from Shandong Deshunyuan Petroleum Technology Co. Ltd.); 1.5% organic amine shale inhibitor AP-2 (purchased from Shandong Deshunyuan Petroleum Technology Co. Ltd.); 2% polyether glycol SYP-2 (purchased from Shandong Deshunyuan Petroleum Technology Co., Ltd.), and water (accounts for the remaining content).

Example 3

A water-based drilling fluid is prepared according to the method described in the example 1, but the water-based drilling fluid is prepared according to the following formulation: 4% reservoir protectant composition (the composition is shown in Table 1, wherein, the polymer elastic granule used in the example 3 is A3, the synthetic fiber is polyester fiber TZT-PET-6, and the film former is zero-permeability drilling fluid additive HY-3000); 2% sodium bentonite (purchased from Anyang Yihe Bentonite Co., Ltd.); 0.8% sulfonate copolymer DSP-2 (purchased from Shandong Deshunyuan Petroleum Technology Co. Ltd.); 1% sulfonated sodium tannin (from Shandong Yanggu Jiangbei Chemical Co., Ltd.); 4% sulfomethylated lignite resin SPNH (purchased from Shandong Deshunyuan Petroleum Technology Co. Ltd.); 2% organic amine shale inhibitor AP-2 (purchased from Shandong Deshunyuan Petroleum Technology Co. Ltd.); 2.5% polyether glycol SYP-2 (purchased from Shandong Deshunyuan Petroleum Technology Co., Ltd.), and water (accounts for the remaining content).

Example 4

A water-based drilling fluid is prepared according to the method described in the example 1, but the polymer elastic granule A1 is replaced with polymer elastic granule A4.

Example 5

A water-based drilling fluid is prepared according to the method described in the example 1, but the polymer elastic granule A1 is replaced with polymer elastic granule A5.

Example 6

A water-based drilling fluid is prepared according to the method described in the example 1, but the composition of the reservoir protectant composition is shown in Table 1, wherein, the polymeric elastic granule used in the example 6 is A1, the synthetic fiber is polyester fiber TZT-PET-6, and the film former is zero-permeability drilling fluid additive HY-3000, i.e., the dose ratio is different.

Example 7

A water-based drilling fluid is prepared according to the method described in the example 1, but the composition of the reservoir protectant composition is shown in Table 1, wherein, the polymer elastic granule used in the example 7 is A1, and the synthetic fiber is polyester fiber TZT-PET-6, i.e., the reservoir protectant composition doesn't contain the film former zero-permeability drilling fluid additive HY-3000.

Example 8

A water-based drilling fluid is prepared according to the method described in the example 1, but the composition of the reservoir protectant composition is shown in Table 1, wherein, the polymer elastic granule used in the example 8 is A1, and the film former is zero-permeability drilling fluid additive HY-3000, i.e., the reservoir protectant composition doesn't contain the synthetic fiber polyester fiber TZT-PET-6.

Comparative Example 1

A water-based drilling fluid is prepared according to the method described in the example 1, but no reservoir protectant composition is added (see Table 1 for the detailed composition), i.e., the drilling fluid is prepared according to the following formulation: 3% sodium bentonite (purchased from Anyang Yihe Bentonite Co., Ltd.); 1% sulfonate copolymer DSP-2 (purchased from Shandong Deshunyuan Petroleum Technology Co. Ltd.); 0.5% sulfonated sodium tannin (purchased from Shandong Yanggu Jiangbei Chemical Co., Ltd.); 2% sulfomethylated lignite resin SPNH (purchased from Shandong Deshunyuan Petroleum Technology Co. Ltd.); 1% organic amine shale inhibitor AP-2 (purchased from Shandong Deshunyuan Petroleum Technology Co. Ltd.); 3% polyether glycol SYP-2 (purchased from Shandong Deshunyuan Petroleum Technology Co., Ltd.), and water (accounts for the remaining content).

Comparative Example 2

A water-based drilling fluid is prepared according to the method described in the example 1, but the reservoir protectant composition is replaced with zero-permeability drilling fluid additive HY-3000 (see Table 1 for the detailed composition), and the content of the zero-permeability drilling fluid additive HY-3000 in the drilling fluid is 3%.

Comparative Example 3

A water-based drilling fluid is prepared according to the method described in the example 1, but the reservoir protectant composition is replaced with polyester fiber TZT-PET-6 (see Table 1 for the detailed composition), and the content of the polyester fiber TZT-PET-6 in the drilling fluid is 3%.

Comparative Example 4

A water-based drilling fluid is prepared according to the method described in the example 1, but the reservoir protectant composition is replaced with polymer elastic granule A1 (see Table 1 for the detailed composition), and the content of the polymer elastic granule A1 in the drilling fluid is 3%.

Comparative Example 5

A water-based drilling fluid is prepared according to the method described in the example 1, but the reservoir protectant composition is replaced with polyester fiber TZT-PET-6 and zero-permeability drilling fluid additive HY-3000 (see Table 1 for the detailed composition), the mass ratio of the polyester fiber TZT-PET-6 to the zero-permeability drilling fluid additive HY-3000 is 1:1, and the total content of the polyester fiber TZT-PET-6 and the zero-permeability drilling fluid additive HY-3000 in the drilling fluid is 3%.

TABLE 1

| | Mass Ratio of Synthetic fiber:Polymer elastic granule:Film Former in the Drilling Fluid |
|---|---|
| Example 1 | 0.25:1:0.25 |
| Example 2 | 0.33:1:0.67 |
| Example 3 | 0.67:1:0.33 |
| Example 4 | 0.25:1:0.25 |
| Example 5 | 0.25:1:0.25 |
| Example 6 | 1.5:1:1.5 |
| Example 7 | 0.25:1:0 |
| Example 8 | 0:1:0.25 |
| Comparative example 1 | 0:0:0 |
| Comparative example 2 | 0:0:1 |
| Comparative example 3 | 1:0:0 |
| Comparative example 4 | 0:1:0 |
| Comparative example 5 | 1:0:1 |

Test Examples

The parameters involved in the present invention are measured with the following methods:

(1) Measurement of Drilling Fluid Properties

The performance parameters of the drilling fluids in the examples 1-8 and the comparative examples 1-5 at 24±3° C. temperature are measured as per GB/T 16783.1-2006. The results are shown in Table 2.

(2) Measurement of Plugging Ratio and Permeability Recovery Ratio

The reservoir protection performance is tested in a SH-1 HTHP (High Temperature And High Pressure) dynamic filtration device as per SYT 6540-2002 Lab Testing Method of Drilling and Completion Fluids Damaging Oil Formation. The dimensions of a well core is measured, the well core is vacuum-pumped and saturated with standard brine for 48 h, and then the oleic permeability $K_1$ (i.e., the initial core permeability in Table 3) is measured in the normal direction; the well core is plugged with the drilling fluids (drilling fluids in the examples 1-8 and comparative examples 1-5) in a dynamic filtration device respectively, the mud cake at the plugging end is removed after the plugging is completed, the oleic permeability $K_2$ (i.e., the core permeability after plugging in Table 3) of the well core is measured in the normal direction, and the plugging ratio is calculated $$BR = \frac{K_1 - K_2}{K_1} \times 100\%.$$

Next, the oleic permeability $K_3$ of the well core in the reversed direction (i.e., the core permeability after flow-back in Table 3) is measured, and the permeability recovery ratio is calculated $$RR = \frac{K_3}{K_1} \times 100\%.$$

The results are shown in Table 3.

TABLE 2

| | Apparent Viscosity (AV)/(mPa·s) | Plastic Viscosity (PV)/(mPa·s) | Yield Point (YP)/Pa | API Filter Loss/ml |
|---|---|---|---|---|
| Example 1 | 61 | 40 | 21 | 3.8 |
| Example 2 | 63 | 45 | 18 | 4.0 |
| Example 3 | 62 | 41 | 19 | 3.7 |
| Example 4 | 59 | 40 | 19 | 4.1 |
| Example 5 | 60 | 38 | 22 | 4.0 |
| Example 6 | 60 | 39 | 21 | 3.7 |
| Example 7 | 56 | 39 | 17 | 4.2 |
| Example 8 | 62 | 40 | 22 | 3.7 |
| Comparative example 1 | 56 | 40 | 16 | 4.8 |
| Comparative example 2 | 60 | 42 | 18 | 4.5 |
| Comparative example 3 | 57 | 41 | 16 | 4.6 |
| Comparative example 4 | 56 | 38 | 18 | 4.6 |
| Comparative example 5 | 60 | 42 | 18 | 4.4 |

It is seen from the data in Table 2: The drilling fluids that contain different combinations of synthetic fiber, polymer elastic granule and film former are not different much from each other in terms of rheological property; however, viewed from the aspect of filter loss, the drilling fluids that contain at least one of polymer elastic granule, synthetic fiber and film former have lower filter loss, and are more advantageous for reservoir protection.

TABLE 3

| Drilling Fluid | Width of Fractures/μm | Initial Core Permeability $K_1/(10^{-3} \mu m^2)$ | Core Permeability after Plugging $K_2/(10^{-3} \mu m^2)$ | Core Permeability after Flow-Back $K_3/(10^{-3} \mu m^2)$ | Plugging Ratio/% | Permeability Recovery Ratio/% |
|---|---|---|---|---|---|---|
| Example 1 | 61.0 | 154.2 | 2.74 | 152.2 | 98.2 | 98.7 |
| Example 2 | 58.5 | 136.5 | 3.75 | 133.1 | 97.3 | 97.5 |
| Example 3 | 58.6 | 146.8 | 4.69 | 141.2 | 96.8 | 96.2 |
| Example 4 | 62.1 | 160.3 | 11.12 | 150.3 | 93.1 | 93.8 |
| Example 5 | 61.4 | 155.7 | 11.93 | 144.5 | 92.3 | 92.8 |
| Example 6 | 59.9 | 149.9 | 10.57 | 137.4 | 92.9 | 91.7 |
| Example 7 | 61.0 | 155.3 | 15.12 | 143.8 | 90.3 | 92.6 |
| Example 8 | 62.1 | 156.7 | 13.21 | 145.5 | 91.6 | 92.9 |
| Comparative example 1 | 60.5 | 139.2 | 50.26 | 93.7 | 63.9 | 67.3 |
| Comparative example 2 | 59.2 | 143.7 | 35.13 | 107.9 | 75.6 | 75.1 |
| Comparative example 3 | 59.6 | 147.8 | 35.25 | 112.6 | 76.2 | 76.2 |
| Comparative example 4 | 59.2 | 139.5 | 17.86 | 123.5 | 87.2 | 88.5 |
| Comparative example 5 | 58.8 | 150.4 | 20.35 | 126.8 | 86.5 | 84.3 |

It is seen from the data in Table 3: in the water-based drilling fluids, though a reservoir protection effect is attained when the three constituents of the reservoir protectant composition are used separately or the synthetic fiber and the film former are used in combination, an obviously better reservoir protection effect is attained with the reservoir protectant composition in the formulation disclosed in the present invention, specifically, the plugging ratio is 90% or higher, preferably 96% or higher; and the permeability recovery ratio is 91% or higher, preferably 96% or higher. The data indicates that the constituents of the reservoir protectant composition have an obvious synergetic effect, and thereby indicates that a water-based drilling fluid that contains the reservoir protectant composition disclosed in the present invention has obvious protective effect for fractured reservoirs.

Specifically, it is seen from the result of comparison between the example 1 and the example 4 in Table 3: in the raw materials for preparing the intermediate product of polymer elastic granule, based on 100 pbw raw materials, if the dose of the acrylamide is 10-25 pbw, the dose of the cationic monomer is 2-5 pbw, the dose of the cross-linker is 0.01-0.05 pbw, the dose of the initiator is 0.02-0.05 pbw, and the dose of the toughener is 8-15 pbw, the reservoir protection effect of the drilling fluid can be further improved.

It is seen from the result of comparison between the example 1 and the example 5 in Table 3: based on 100 pbw polymer elastic granule, if the dose of the intermediate product is 10-30 pbw, the dose of the alkali is 2-5 pbw, and the dose of the salt is 5-10 pbw, the reservoir protection effect of the drilling fluid can be further improved.

It is seen from the result of comparison between the example 1 and the example 6 in Table 3: if the mass ratio of the polymer elastic granule to the synthetic fiber to the film former is 1:(0.25-1):(0.25-1), the reservoir protection effect of the drilling fluid can be further improved.

It is seen from the result of comparison between the example 1 and the examples 7-8 in Table 3: if the reservoir protectant composition contains the polymer elastic granule, the synthetic fiber and the film former at the same time, the reservoir protection effect of the drilling fluid can be further improved.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the scope of protection of the present invention.

In addition, it should be noted that the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A water-based drilling fluid comprising: a tackifier, a filtrate reducer, a reservoir protectant composition, and water,
wherein, the reservoir protectant composition comprises a polymer elastic granule and both of a synthetic fiber and a film former,
wherein, the polymer elastic granule is prepared from an intermediate product, an alkali, a salt, and water and, based on 100 pbw of the polymer elastic granule, the dose of the intermediate product is 5-40 pbw, the dose of the alkali is 1-10 pbw, and the dose of the salt is 1-12 pbw,
wherein, the intermediate product is prepared from raw materials including acrylamide, a cationic monomer, a cross-linker, an initiator, a toughener, and water and, based on 100 pbw of the raw materials, the dose of the acrylamide is 8-30 pbw, the dose of the cationic monomer is 1-10 pbw, the dose of the cross-linker is 0.01-0.5 pbw, the dose of the initiator is 0.01-0.1 pbw, and the dose of the toughener is 5-25 pbw.

2. The water-based drilling fluid of claim 1, further comprising one or more of the following: bentonite, a diluent, an anti-collapse agent, a lubricant, and combinations thereof.

3. The water-based drilling fluid according to claim 1, wherein the mass ratio of the polymer elastic granule to the synthetic fiber is 1:0.1 to 1:1.5; the mass ratio of the polymer elastic granule to the film former is 1:0.1 to 1:1.5.

4. The water-based drilling fluid according to claim 1, wherein the reservoir protectant composition comprises a polymer elastic granule, a synthetic fiber, and a film former, and the mass ratio of the polymer elastic granule to the synthetic fiber to the film former is 1:(0.1-1.5):(0.1-1.5).

5. The water-based drilling fluid according to claim 1, wherein based on 100 pbw of the raw materials for preparing the intermediate product, the dose of the acrylamide is 10-25 pbw, the dose of the cationic monomer is 2-5 pbw, the dose of the cross-linker is 0.01-0.05 pbw, the dose of the initiator is 0.02-0.05 pbw, and the dose of the toughener is 8-15 pbw.

6. The water-based drilling fluid according to claim 1, wherein based on 100 pbw of the polymer elastic granule, the dose of the intermediate product is 10-30 pbw, the dose of the alkali is 2-5 pbw, and the dose of the salt is 5-10 pbw.

7. The water-based drilling fluid according to claim 1, wherein the cationic monomer is a quaternary ammonium compound; and/or
the cross-linker is at least one of N, N'-methylene-bis acrylamide, divinyl benzene, and glutaraldehyde; and/or
the initiator is persulfate; and/or
the toughener is starch and/or bentonite; and/or
the alkali is at least one of sodium hydroxide, potassium hydroxide, sodium carbonate, potassium carbonate, sodium bicarbonate, and potassium bicarbonate; and/or
the salt is at least one of sodium chloride, potassium chloride, calcium chloride, sodium formate, potassium formate, and cesium formate; and/or
the synthetic fiber is at least one of polyester fiber, polyamide fiber, polyacrylonitrile fiber, polyvinyl alcohol fiber, polyvinyl formal fiber, and polyurethane elastic fiber; and/or
the film former is an ultra-low permeability drilling fluid additive and/or zero-permeability drilling fluid additive.

8. The water-based drilling fluid according to claim 7, wherein the initiator is at least one of ammonium persulfate, potassium persulfate, and sodium persulfate.

9. The water-based drilling fluid according to claim 7, wherein the cationic monomer is at least one of dimethyldiallyl ammonium halide, methacryloyloxyethyl-trimethyl ammonium halide, acryloyloxyethyl-trimethyl ammonium halide, alkyldimethylbenzyl ammonium halide, and alkyltrimethyl ammonium halide.

10. The water-based drilling fluid according to claim 9, wherein the alkyl substituent in alkyldimethylbenzyl ammonium halide is C8-C20 alkyl, and the alkyl substituent in alkyltrimethyl ammonium halide is C8-C20 alkyl.

11. The water-based drilling fluid according to claim 1, wherein the polymer elastic granule further comprises a bactericide and, based on 100 pbw of the polymer elastic granule, the dose of the bactericide is 0.03-2 pbw.

12. The water-based drilling fluid according to claim 11, wherein the bactericide is an absorptive bactericide.

13. The water-based drilling fluid according to claim 12, wherein is at least one of alkyltrimethyl ammonium halide, alkylpyridinium halide, and alkyldimethylbenzyl ammonium halide.

14. The water-based drilling fluid according to claim 13, wherein the alkyl substituent in alkyltrimethyl ammonium halide is C8-C20 alkyl, the alkyl substituent in alkylpyridinium halide is C8-C20 alkyl, and the alkyl substituent in alkyldimethylbenzyl ammonium halide is C8-C20 alkyl.

15. The water-based drilling fluid according to claim 2, wherein based on 100 ml of the water-based drilling fluid, the amount of the bentonite is 0-4 g; the amount of the tackifier is 0.2-2 g; the amount of the diluent is 0-2 g; the amount of the filtrate reducer is 1-5 g; the amount of the anti-collapse agent is 0-3 g; the amount of the reservoir protectant composition is 1-5 g; the amount of the lubricant is 0-5 g.

16. The water-based drilling fluid according to claim 2, wherein based on 100 ml of the water-based drilling fluid, the amount of the bentonite is 1-3 g; the amount of the tackifier is 0.5-1 g; the amount of the diluent is 0.5-1 g; the amount of the filtrate reducer is 2-4 g; the amount of the anti-collapse agent is 1-2 g; the amount of the reservoir protectant composition is 2-4 g; the amount of the lubricant is 2-3 g.

17. The water-based drilling fluid according to claim 2, wherein the bentonite is sodium bentonite and/or calcium bentonite; and/or
the tackifier is at least one of sulfonate copolymer, potassium polyacrylamide, polyanionic cellulose, xanthan gum, sodium carboxymethylcellulose, and polyacrylamide; and/or
the diluent is sulfonated sodium tannin and/or zwitterionic polymer viscosity reducer; and/or
the filtrate reducer is at least one of sulfomethylated phenolic resin, lignite resin, sulfomethylated lignite resin, and zwitterionic polymer; and/or
the anti-collapse agent is at least one of organic amine shale inhibitor, potassium humate, organic silicon, and modified asphalt; and/or the lubricant is at least one of graphite, mineral oil, vegetable oil, plastic beads, and polyether glycol.

18. A method for preparing the water-based drilling fluid according to claim 2, comprising: mixing optional bentonite, the tackifier, the optional diluent, the filtrate reducer, the optional anti-collapse agent, the reservoir protectant composition, the optional lubricant, and water homogeneously.

19. The method according to claim 18, wherein the method comprises: mixing bentonite, the tackifier, the diluent, the filtrate reducer, the anti-collapse agent, the reservoir protectant composition, the lubricant, and water homogeneously, wherein the mixing comprises: mixing bentonite with water, adding the tackifier after 18-36 h and stirring; and then adding the filtrate reducer, the anti-collapse agent, the lubricant, the diluent, and the reservoir protectant composition, and stirring for 20-40 min.

20. A method for drilling a reservoir, the method comprising applying a water-based drilling fluid according to claim 1, wherein the reservoir is a fractured reservoir.

* * * * *